US012786568B2

(12) United States Patent
Park et al.

(10) Patent No.: US 12,786,568 B2
(45) Date of Patent: Nov. 3, 2026

(54) DISTANCE INFORMATION GENERATION APPARATUS AND METHOD

(71) Applicant: HANWHA VISION CO., LTD., Seongnam-si (KR)

(72) Inventors: Dong Jin Park, Seongnam-si (KR); Dae Bong Kim, Seongnam-si (KR); Young Sang Kwon, Seongnam-si (KR); Hyuck Rae Kim, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 3 days.

(21) Appl. No.: 18/936,561

(22) Filed: Nov. 4, 2024

(65) Prior Publication Data

US 2025/0063255 A1 Feb. 20, 2025

Related U.S. Application Data

(63) Continuation of application No. PCT/KR2023/005963, filed on May 2, 2023.

(30) Foreign Application Priority Data

May 4, 2022 (KR) ........................ 10-2022-0055392
Apr. 28, 2023 (KR) ........................ 10-2023-0056043

(51) Int. Cl.
*H04N 23/69* (2023.01)
*H04N 23/67* (2023.01)
*H04N 23/695* (2023.01)

(52) U.S. Cl.
CPC ........... *H04N 23/69* (2023.01); *H04N 23/673* (2023.01); *H04N 23/675* (2023.01); *H04N 23/695* (2023.01)

(58) Field of Classification Search
CPC .... H04N 23/67; H04N 23/673; H04N 23/675; H04N 23/69; H04N 23/695
See application file for complete search history.

(56) References Cited

U.S. PATENT DOCUMENTS

2004/0130650 A1* 7/2004 Lee ...................... H04N 23/673 348/E5.045
2011/0261225 A1* 10/2011 Niinami .................. G06T 7/248 382/103
(Continued)

FOREIGN PATENT DOCUMENTS

KR 10-2009-0056592 * 11/2007
KR 10-2012-0125804 A 11/2012
(Continued)

OTHER PUBLICATIONS

Machine Translation for KR 10-2009-0056592 to Kim (Year: 2007).*
(Continued)

*Primary Examiner* — Daniel M Pasiewicz
(74) *Attorney, Agent, or Firm* — Sughrue Mion, PLLC

(57) ABSTRACT

A distance information generation apparatus includes: at least one processor, and at least one memory storing program instructions, where, by executing the program instructions, the at least one processor is configured to: divide a first image captured by an imaging device into a plurality of blocks; determine direction movement values for at least one block among the plurality of divided blocks as targets; control an imaging direction of the imaging device based on the direction movement values of the at least one block; and acquire distance information for the at least one block based on a second image captured by the imaging device.

17 Claims, 7 Drawing Sheets

(56) References Cited

U.S. PATENT DOCUMENTS

| | | | |
|---|---|---|---|
| 2015/0009393 | A1 | 1/2015 | Inoue et al. |
| 2019/0265029 | A1 | 8/2019 | Wang et al. |

FOREIGN PATENT DOCUMENTS

| | | | |
|---|---|---|---|
| KR | 10-1396347 | B1 | 5/2014 |
| KR | 10-2018-0073460 | A | 7/2018 |
| KR | 10-2278536 | B1 | 7/2021 |
| WO | 2021/128747 | A1 | 7/2021 |

OTHER PUBLICATIONS

International Search Report (PCT/ISA/210) issued by the International Searching Authority on Jul. 26, 2023 in corresponding International Application No. PCT/KR2023/005963.

Written Opinion (PCT/ISA/237) issued by the International Searching Authority on Jul. 26, 2023 in corresponding International Application No. PCT/KR2023/005963.

Extended European Patent Office dated Oct. 10, 2025, issued by the European Patent Office in European Application No. 23799647.5.

* cited by examiner

DISTANCE INFORMATION GENERATION APPARATUS AND METHOD

CROSS-REFERENCE TO RELATED APPLICATION(S)

This application is a continuation of International Application No. PCT/KR2023/005963, filed on May 2, 2023, in the Korean Intellectual Property Receiving Office, which is based on and claims priority to Korean Patent Applications No. 10-2022-0055392, filed on May 4, 2022 and No. 10-2023-0056043, filed on Apr. 28, 2023, in the Korean Intellectual Property Office, the disclosures of which are incorporated by reference herein in their entireties.

BACKGROUND

1. Field

The present disclosure relates to a distance information generation apparatus and method, and more particularly, to a technology for automatically acquiring distance information at an arbitrary position within an image currently being captured.

2. Description of Related Art

Generally, a camera device provides a feature that allows the user to manually set the focus value for a specific scene. This feature is referred to as focus save, focus recall, focus preset, etc.

According to this feature, when the user moves the camera device in the pan, tilt, or zoom direction and determines that they are viewing the same scene as a previously stored scene, the lens is adjusted to the corresponding stored focus value. This function is particularly necessary for critical areas where the focus must not shift, such as the entrance to a parking lot. This is because auto-focus (AF) performs poorly in low-light environments or spot-light conditions. As a result, the license plate of a car may not be properly recognized, or the AF performance may degrade due to car headlights.

However, these conventional techniques only provide a feature that allows the user to manually set and store the focus position, and do not offer a function that automatically sets the focus position (distance information) for an arbitrary location included in a specific image.

Therefore, a solution to this problem may go beyond the limitation of manually storing the focus position, by enabling the automatic acquisition of distance information for an arbitrary position within an image currently being captured.

SUMMARY

Provided is an apparatus and method for generating and storing distance information for each divided block within an image being captured and utilizing that distance information.

Further provided is an apparatus and method for automatically generating and storing a focus position for a region of interest among a first image.

However, aspects of the present invention are not restricted to those set forth herein. The above and other aspects will become more apparent to one of ordinary skill in the art to which the disclosure pertains by referencing the detailed description of the present disclosure given below.

According to an aspect of the disclosure, a distance information generation apparatus may include: at least one processor; and at least one memory storing program instructions, where, by executing the program instructions, the at least one processor is configured to: divide a first image captured by an imaging device into a plurality of blocks; determine direction movement values for at least one block among the plurality of divided blocks as targets; control an imaging direction of the imaging device based on the direction movement values of the at least one block; and acquire distance information for the at least one block based on a second image captured by the imaging device.

The distance information for the at least one block may include a representative distance value for the at least one block based on the direction movement values of the at least one block among the plurality of divided blocks.

The first image may be divided into M blocks in a horizontal direction and a vertical direction, in which M is a natural number.

The direction movement values may include pan, tilt, and zoom (PTZ) values for the at least one block, where the second image is a zoomed-in image having a same size as the first image.

The at least one processor may be further configured to: provide, through a user interface, distance information for one or more blocks corresponding to a region of interest based on a specific position in the first image being set as the region of interest.

The at least one processor may be further configured to: obtain, through a user interface, a specific position in the first image as a region of interest, acquire distance information for the region of interest based on distance information for one or more blocks corresponding to the region of interest, and control the imaging device to capture an image based on a focus distance according to the acquired distance information.

The at least one processor may be further configured to: based on the region of interest spanning two or more blocks, obtain the distance information for the region of interest based on distance information of each of the two or more blocks and an area ratio of an overlapping portion between the region of interest and each of the two or more blocks.

The at least one processor may be further configured to: based on a continuous automatic focusing operation (auto-focusing) for the region of interest, obtain the distance information for the region of interest based on the distance information for each of the two or more blocks, and an area ratio of an overlapping portion between the region of interest and each of the two or more blocks.

The at least one processor may be further configured to: determine a scan order of the plurality of divided blocks.

The at least one processor may be further configured to determine a range of a number of divisions for the plurality of blocks.

A lower limit of the range of the number of divisions may be based on a value that enables the imaging device to obtain a minimum distance resolution.

An upper limit of the range of the number of divisions may be based on a value that enables a processing time to acquire the distance information for the at least one block to be below a threshold.

The at least one processor may be further configured to: receive, through a user interface, a trigger command from a user to divide the first image into the plurality of blocks.

The at least one processor may be further configured to: based on the lower limit of the range being determined to be greater than or equal to the upper limit, control the imaging device to capture a zoomed-in image from the first image, and divide the captured zoomed-in image into the plurality of blocks.

According to an aspect of the disclosure, a distance information may include: at least one processor; at least one memory storing program instructions, where, by executing the program instructions, the at least one processor is configured to: divide a first image captured by an imaging device into a plurality of blocks; determine direction movement values for capturing at least one block among the plurality of divided blocks as targets; control an imaging direction of the imaging device based on the direction movement values of the at least one block; and acquire, through a distance sensor connected to the imaging device, distance information for the at least one block.

The distance sensor may include a LIDAR distance meter or a laser distance meter.

According to an aspect of the disclosure, provided is a distance information generation method performed by an apparatus having at least one processor and at least one memory that stores program instructions executed by the at least one processor, the distance information generation method may include: dividing a first image captured by an imaging device into a plurality of blocks; determining direction movement values for capturing at least one block among the plurality of divided blocks as targets; controlling an imaging direction of the imaging device based on the direction movement values of the at least one block; and acquiring distance information for the at least one block based on a second image captured by the imaging device.

The dividing the first image may include: dividing the first image into M blocks in a horizontal direction and a vertical direction, in which M is a natural number.

The direction movement values may include pan, tilt, and zoom (PTZ) values for the at least one block, where the second image is a zoomed-in image having a same size as the first image.

The distance information generation method may further include: determining a range of a number of divisions for the plurality of blocks, where a lower limit of the range of the number of divisions is based on a value that enables the imaging device to secure a minimum distance resolution, and where an upper limit of the range of the number of divisions is based on a value that enables a processing time to acquire the distance information for the at least one block to be below a threshold.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
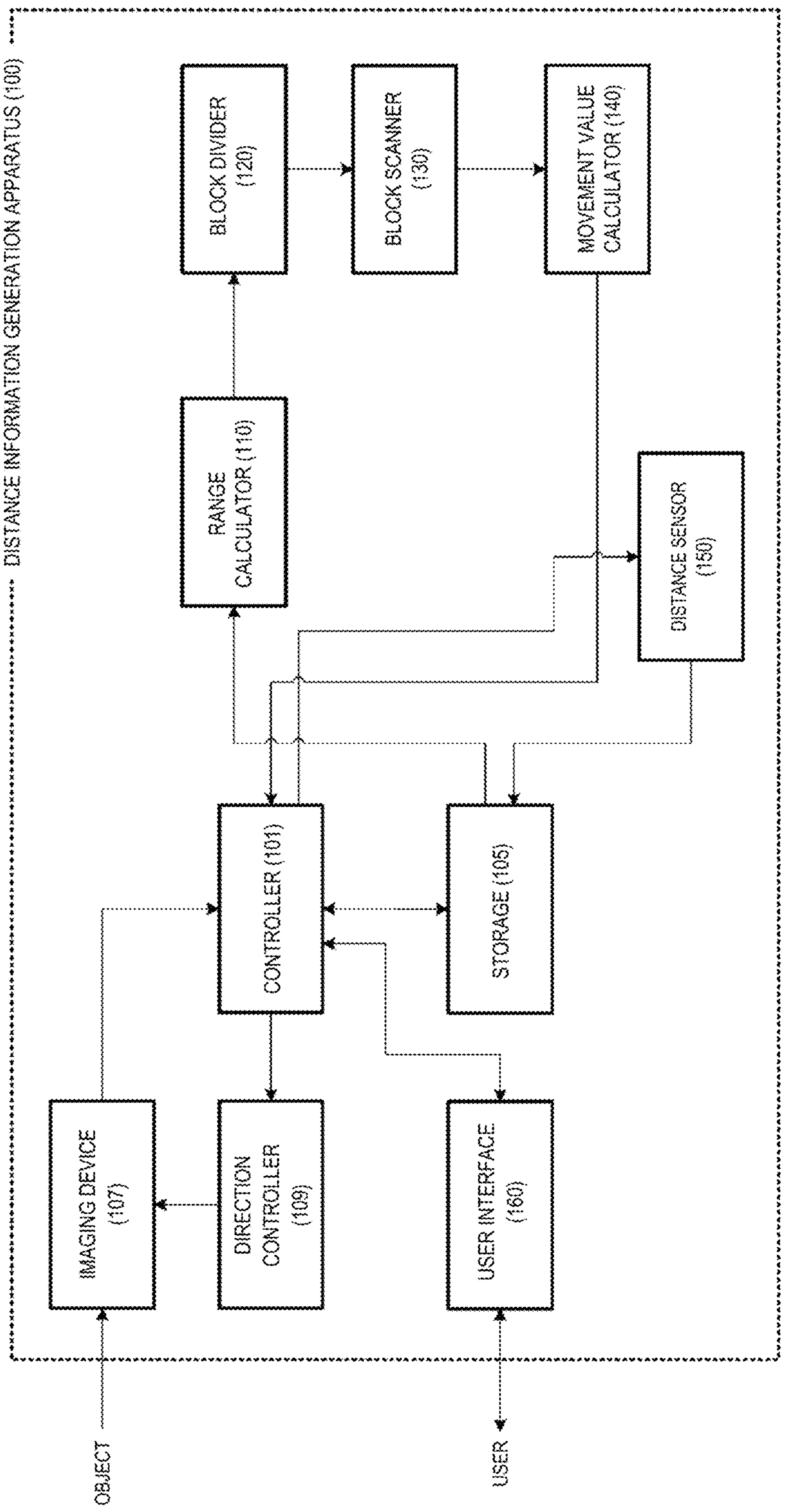
FIG. 1 is a block diagram illustrating the configuration of a distance information generation apparatus according to an embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word “includes,” “comprises,” “has,” “having,” “including,” “comprising,” and variations will be understood to imply the inclusion of stated elements but not the exclusion of any other elements.

Hereinafter, exemplary embodiments of the present disclosure will be described in detail with reference to the accompanying drawings. FIG. 1 is a block diagram illustrating the configuration of a distance information generation apparatus 100 according to an embodiment of the present disclosure. The distance information generation apparatus 100 may include a controller 101, a storage 105, an imaging device 107, a direction controller 109, a range calculator 110, a block divider 120, a block scanner 130, a movement value calculator 140, a distance sensor 150, and a user interface 160. However, in some embodiments of the present disclosure, the distance information generation apparatus 100 may not include the imaging device 107 and the direction controller 109, which are components of a so-called camera device, and may instead be configured to communicate with the camera device. In this case, the distance information generation apparatus 100 may further include a communication interface for communicating with the camera device.

The controller 101 may control the operations of other components of the distance information generation apparatus 100. The controller 101 may be physically implemented by analog and/or digital circuits including one or more of a logic gate, an integrated circuit, a central processing unit (CPU), a microprocessor, a memory circuit, a passive electronic component, an active electronic component, an optical component, or the like, and may implement or execute software and/or firmware to perform the functions or operations described herein. In addition, the storage 105 may store the results of processes performed by the controller 101 or stores data for the operation of the controller 101, such as program instructions executed by the controller 101. The storage 105 may include a plurality of memory modules. Alternatively or additionally, the storage device may an external memory device, a hard disk, and/or an optical disk, a cloud storage, not being limited thereto, and may be connected to the controller 150 wiredly or wirelessly. The storage 105 may be implemented as either volatile memory or non-volatile memory.

The imaging device 107 can be opened or closed by a shutter and may include an optical system (such as lens) that allows light to enter when the shutter is open, and an image sensor configured to capture the light and output it as electrical signals. The captured image may be displayed as either an analog signal or a digital signal. This digital signal may be pre-processed by an image signal processor (ISP) or image processing unit before being provided to the controller 101 and may be temporarily or permanently stored in the storage 105.

At this time, the imaging device 107 may have its imaging direction changed by the direction controller 109 according to the movement values determined by the controller 101. In the present disclosure, the term "imaging direction" refers to at least one of the parameters, i.e., pan, tilt, and zoom that indicate displacement in three-dimensional (3D) space. The direction controller 109 may change the zoom position by moving the lens of the imaging device 107 forward or backward within a predetermined range, and may change the orientation of the imaging device 107 by rotating the imaging device 107 in the pan direction and/or tilt direction.

The user interface 160 may have the function of interacting with a user, that is, receiving specific commands from the user or displaying relevant information to the user. For this purpose, the user interface 160 may include both an input and an output. The input may include a mouse, keyboard, voice recognition device, motion recognition device, etc., and the output may include a display device such as an LED or LCD, a speaker, a haptic device, etc. In some embodiments, the user interface 160 may be a device that simultaneously includes both an input and an output, such as a touch screen.

Through the user interface 160, the user may designate a specific location within an image currently being captured as a region of interest and may input a trigger command for dividing the image being captured into a plurality of blocks. The user may also receive the distance information for the block corresponding to the designated region of interest through the user interface 160.

The block divider 120 may divide a first image 10, which is captured by the imaging device 107, into a plurality of blocks. This division may be performed automatically within the range (upper and lower limits) of the number of divisions that will be described later, or may be performed according to a command from the user via the user interface 160.

Figure 2:
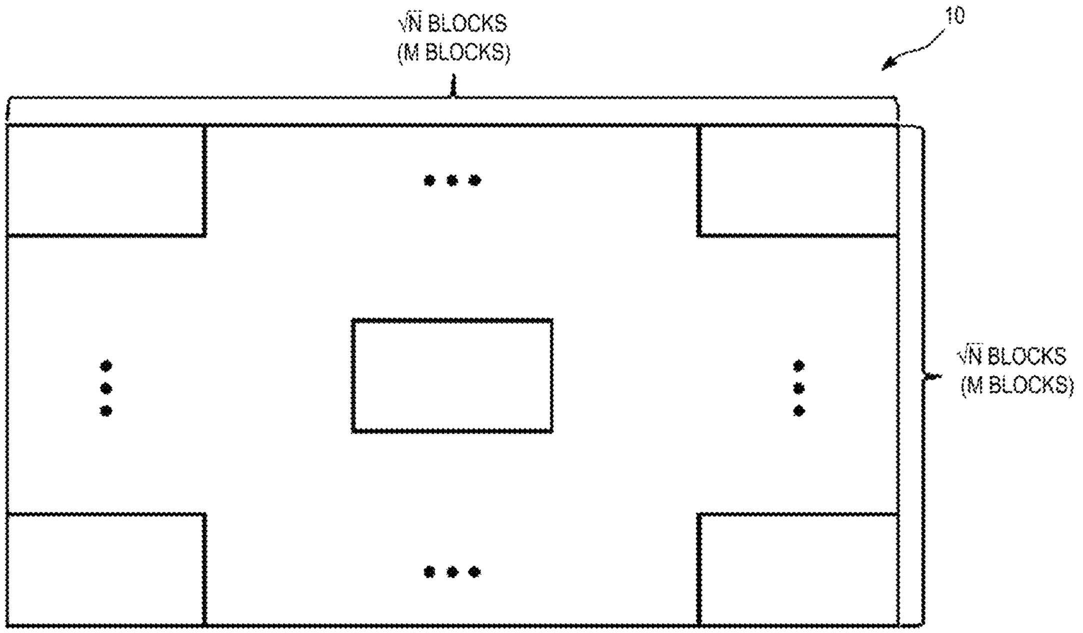
FIG. 2 is a diagram illustrating the result of dividing a first image into a plurality of (M×M) blocks according to an embodiment of the present disclosure.

Here, the plurality of blocks may be M×M blocks obtained by dividing the first image 10 in the horizontal and vertical directions, as illustrated in FIG. 2 (where M is a natural number). In this case, when a second image 20 is divided into N blocks, the following equation is satisfied: $N=M^2$.

Dividing the first image 10 into the same numbers of blocks in both the horizontal and vertical directions may ensure that the size of each divided image matches the size of the first image 10 when enlarged. However, the present disclosure is not limited to this configuration, and the numbers of divisions in the horizontal and vertical directions may vary. In the following, the numbers of divisions in the horizontal and vertical directions will be explained as being the same.

The movement values may be defined as the pan/tilt/zoom (PTZ) values for each block, and a second image 20 may be a zoomed-in image of the same size as the first image 10. At this time, the zoom-in offset from the first image 10 to the second image 20 may be $\sqrt{N}$. That is, if the first image 10 is enlarged by $\sqrt{N}$ times, the second image 20 may be obtained.

Figure 3:
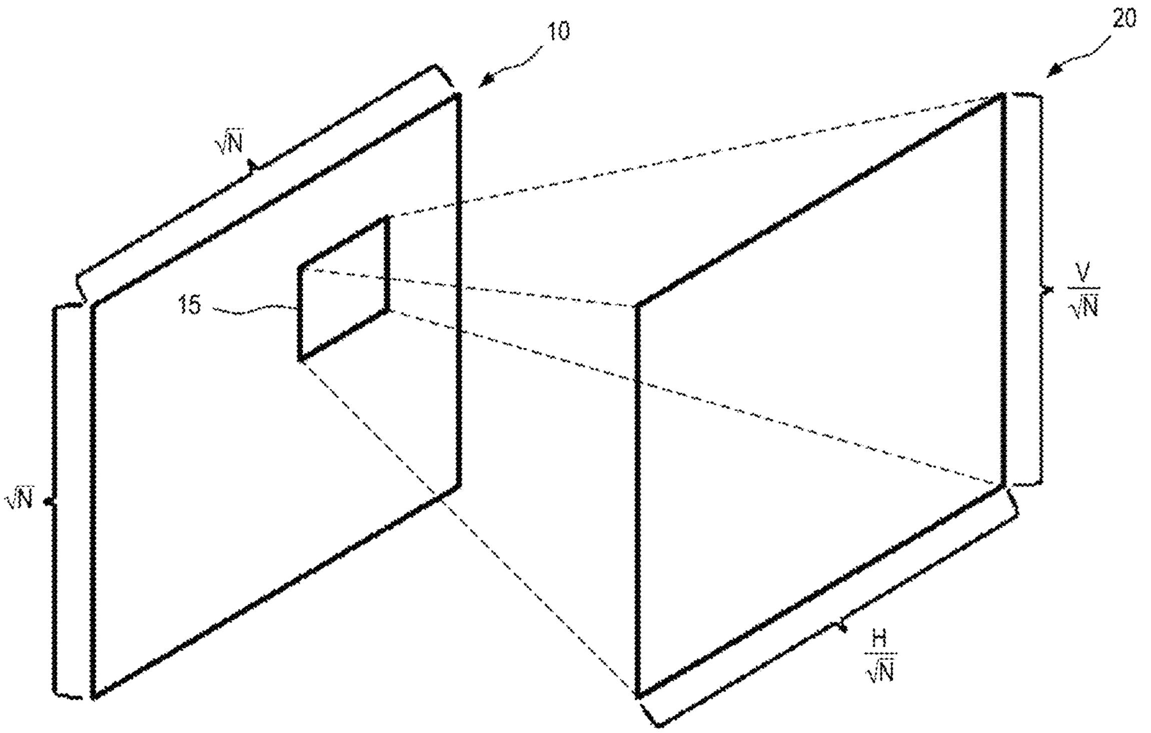
FIG. 3 is a diagram illustrating the result of zooming in on a specific block within the first image to obtain a second image according to an embodiment of the present disclosure.

Referring to FIG. 3, the first image 10 may be divided into $\sqrt{N}$ (M) blocks in both the horizontal and vertical directions, resulting in a total of N blocks 15. Each block 15 may be zoomed in to obtain a second image 20 of the same size as the first image 10. At this time, when the vertical and horizontal sizes of the first image 10 are denoted as V and H, respectively, the vertical size of the second image 20 may become $V/\sqrt{N}$, and the horizontal size of the second image 20 may become $H/\sqrt{N}$.

Figure 4:
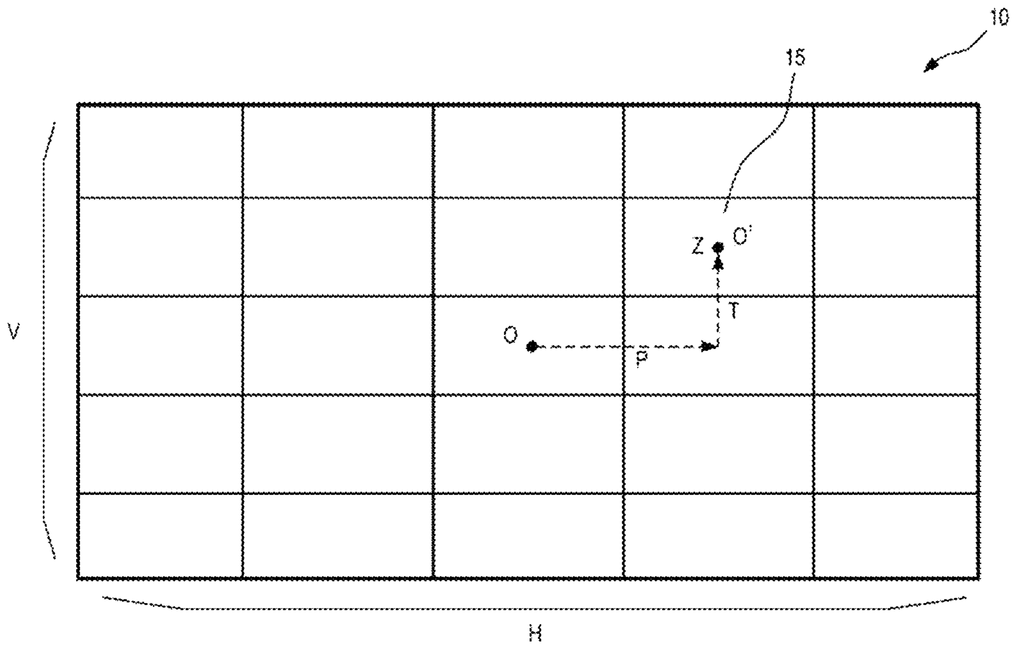
FIG. 4 is a diagram illustrating the pan/tilt offset between the center of the first image and the center of a divided block according to an embodiment of the present disclosure.

However, unless the block 15 is at the center of the first image 10, simply zooming in may not obtain the second image 20 corresponding to the block 15. In addition to zooming in, pan/tilt control may also be required. For example, referring to FIG. 4, since the block 15 is not at a center O of the first image 10, the imaging device 107 may need to be moved by a pan offset P and a tilt offset T from the center O of the image to ensure that it is oriented toward a center O' of the block 15. These offsets P and T may be determined by dividing a vertical size V and a horizontal size H of the first image 10 by $\sqrt{N}$, respectively. Depending on the position of the block 15, the divided value may need to be multiplied by an integer.

In this manner, the movement value calculator 140 may determine the direction movement values for targeting each block 15 among the divided blocks. The direction movement values may be configured to include the zoom-in offset, pan offset, and tilt offset.

Additionally, before the movement value calculator 140 determines the direction movement values for each block 15, the block scanner 130 may determine in advance the scan order of the divided blocks 15. According to an embodiment, the scan order may be performed in a direction that minimizes the distance between blocks to reduce scan time. However, the scan order is not limited to any specific method, such as sequential scanning or zigzag scanning.

According to an embodiment, the method for obtaining the second image 20 for each block 15 through the scan order may be one of the following two methods:

i) After obtaining the distance information for the block at a starting position through zooming in, returning to the starting position, moving to the second block, and zooming in to obtain the distance information; and ii) Pre-calculating the coordinate values (pan/tilt offsets) for all the blocks from the starting position, zooming in, and moving according to the determined coordinate values to obtain the distance information for each block at once.

The distance sensor 150 may analyze the second image 150 captured by the imaging device 107, whose imaging direction has been changed according to the determined direction movement values, to acquire the distance information for each block 15. The distance information for each block 15 may be a representative distance value for each block 15 belonging to the divided blocks, based on the direction movement values for each block. The representative distance value may be a distance value that can represent the block 15, as the block 15 is composed of multiple pixels and thus may need to be defined as a single value. For example, the representative distance value may be obtained by finding the optimal focus position for the second image 20 corresponding to the block 15.

Figure 5:
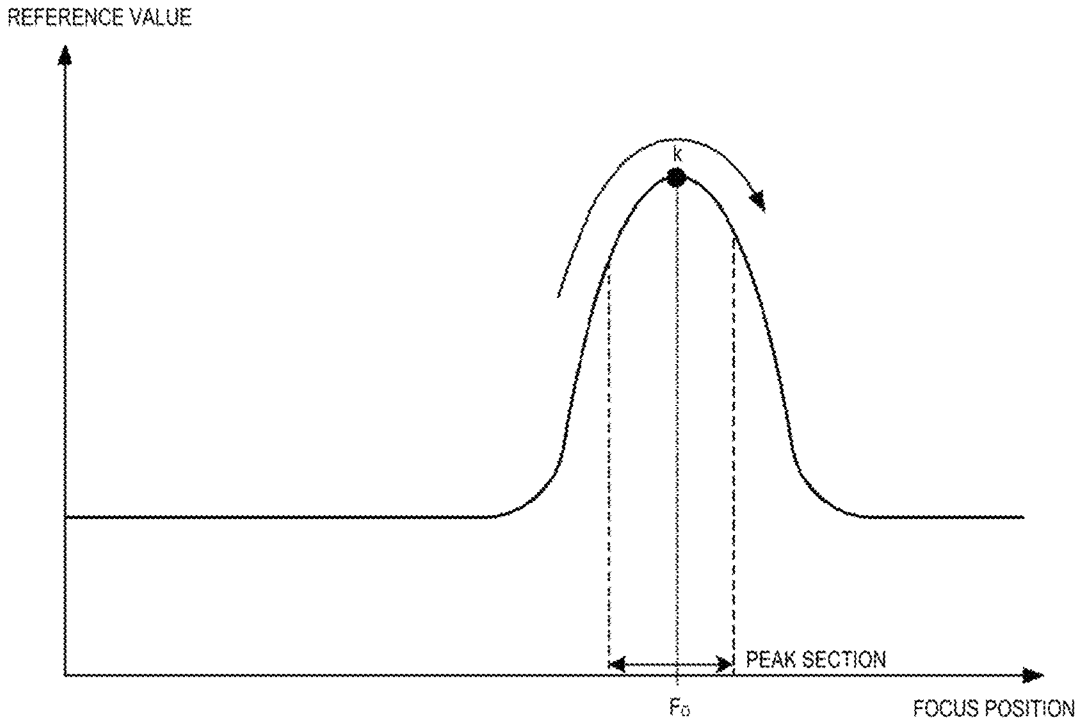
FIG. 5 is a diagram illustrating the process of finding an optimal focus position according to an embodiment of the present disclosure.

Referring to FIG. 5, the controller 101 may move the lens of the imaging device 107 within a predetermined range by the direction controller 109, searching for the optimal focus position where the reference value is maximized within that range. For this end, the controller 101 may continuously check changes in the reference value while the focus position of the lens is being adjusted. Initially, while moving in relatively large steps, the controller 101 may first find a peak section Fo that includes the point (peak point) where a peak value occurs. Once the peak section Fo is found, the controller 101 may perform fine adjustments within that peak section to discover a final peak point k, and the focus position at this peak point k may be set as the optimal focus position. In some instances, contrast data or edge data may be used as the reference value. This contrast data may be defined as the sum of the absolute differences (SAD) between the pixel values in the region of interest and the surrounding pixels, and the larger this value, the more edge data or detail the image contains. In general, edge data may have a higher value when the focus is accurate.

Once the distance sensor 150 determines the focus position for each block 15, the distance information for the block 15 corresponding to the focus position at the specific zoom level may be obtained using locus data. The locus data may be based on the optical characteristics of the imaging device 107 and may be provided as specification information for the imaging device 107.

Figure 6:
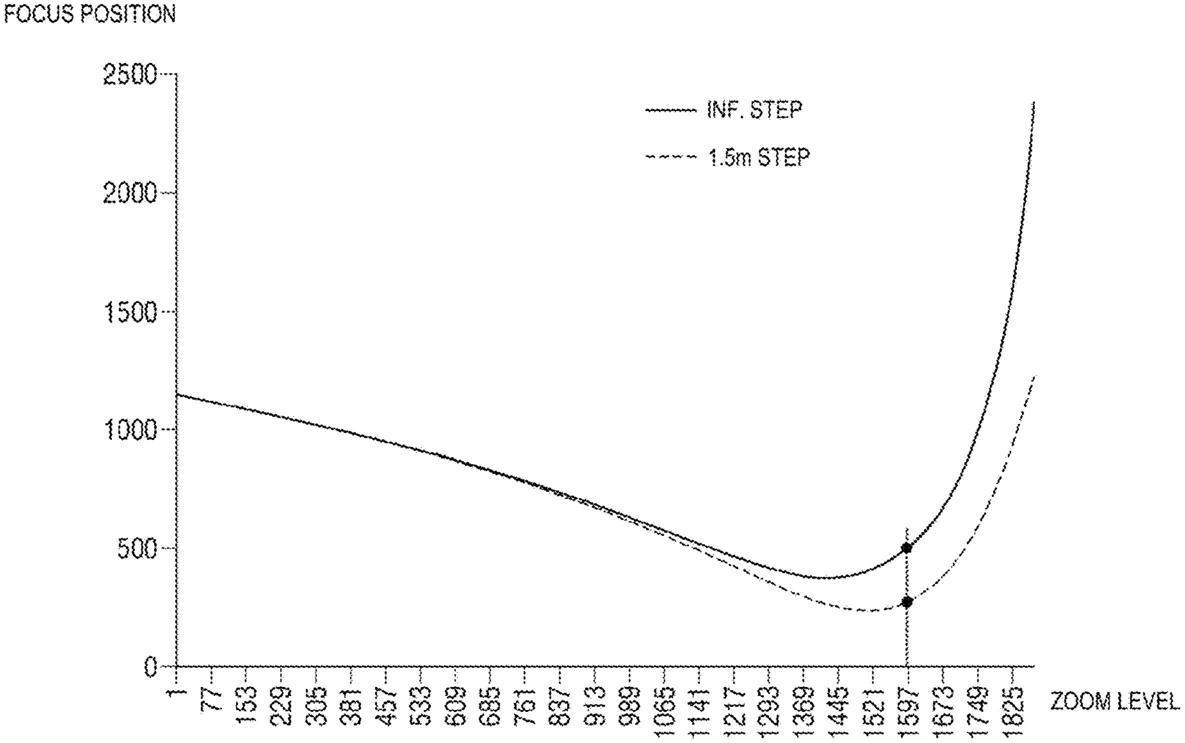
FIG. 6 is a graph showing locus data that shows changes in focus position at a specific zoom ratio according to an embodiment of the present disclosure.

Referring to FIG. 6, only locus data at infinity (Inf) (solid line) and at 1.5 meters (dotted line) are illustrated. For example, at a zoom-in level of 1597, the focus position at 1.5 meters is approximately 300 meters, and the focus position at infinity at the same zoom-in level is approximately 500. Therefore, if the focus position at a zoom-in level of 1597 is determined to be 300, it may indicate that the distance between the imaging device 107 and the subject within the block 15 is 1.5 meters. Additionally, if the focus position at a zoom-in level of 1597 is determined to be 500, it may indicate that the block 15 is at infinity and can be treated as a background.

Once the distance information for each block 15 is acquired, this distance information may be used in various manners. For example, the distance information may be used for a fast automatic focus operation (e.g., fast auto-focusing) and/or for detecting events (e.g., regions of interest) related to objects within the image. In the latter case, if an event is triggered when a specific object approaches within a certain distance, the acquired distance information for the block 15 may be used to determine whether the specific object is within the proximity. Additionally, when the user designates a specific location within the first image 10 as a region of interest, the distance information for the block corresponding to the region of interest may be provided to the user through the user interface 160.

Furthermore, the method of utilizing the distance information for fast auto-focusing may involve enabling the controller 101 to obtain the distance information for the block corresponding to the region of interest and capture an image using the imaging device 107 based on the focus distance determined by the distance information. The controller 101 may determine the initial focus position for auto-focus searching based on the distance information of the block 15 corresponding to the position of interest designated by the user, and auto-focusing may be performed near this initial focus position. In other words, since the optimal focus position only needs to be searched within a reduced margin, the time required for auto-focusing is reduced.

However, as described above, if the position of interest designated by the user coincides with or is included in a specific block 15, auto-focusing may be performed using the stored distance information for the specific block 15. If the position of interest spans two or more blocks 15, a determination may be made regarding which block's distance information should serve as the basis for auto-focusing.

For example, the sum of the area ratio of the overlapping portion between the region of interest and the two or more blocks 15, multiplied by the distance information for the two or more blocks 15, i.e., the weighted sum of distance information based on the overlapping area, may be calculated or interpolated as the distance information for the region of interest.

The method of determining the distance information for the region of interest using this weighted sum may also be applied in a case in which the region of interest moves due to the movement of an object. For example, even if the original region of interest coincides with or is included in a specific block 15, due to movement, it may inevitably span two or more blocks 15. In this case, if auto-focusing is to be performed continuously or at certain intervals, the distance information for the region of interest at a specific moment may be calculated or interpolated using the weighted sum of the distance information based on the overlapping area, as described above.

The range calculator 110 may determine the range of the number of divisions for the divided blocks. The reason for determining the range of the number of divisions is that if the number of block divisions is too small, the minimum distance resolution cannot be accurately secured, and when converting the focus distance to the actual distance between the object and the imaging device, the margin of error becomes too large, making an accurate and practical distance conversion impossible. Therefore, the lower limit of the number of divisions may be a value that allows the imaging device 107 to secure the minimum distance resolution.

A method for determining the number of block divisions will hereinafter be explained.

Figure 7:
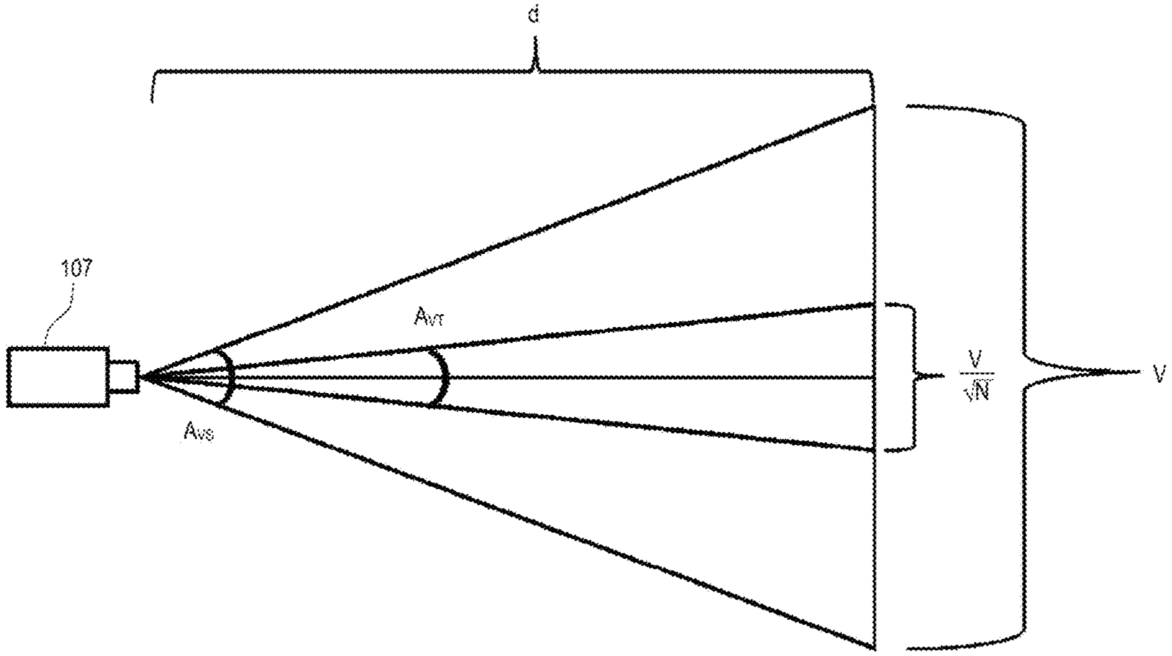
FIG. 7 is a diagram illustrating the geometric relationship between a start view angle and a target view angle according to an embodiment of the present disclosure.

Referring to FIG. 7, the view angle of the first image 10 is defined as a start view angle, with the vertical view angle represented as $A_{VS}$ and the horizontal view angle represented as $A_{HS}$. In addition, the view angle of the second image 20 generated by zooming in on block 15 is defined as a target view angle, with the vertical view angle represented as $A_{VT}$ and the horizontal view angle represented as $A_{HT}$. Furthermore, V represents the vertical height of the first image 10, and $\sqrt{N}$ represents the number of vertical divisions.

Here, according to the geometric proportional relationship, the vertical target view angle $A_{VT}$ may be calculated according to Equation 1 below. According to Equation 1, when the first image 10 is divided into N blocks, the zoom position (zoom ratio) of the second image 20, which is the target image, may be obtained.

[Equation 1]

$$V = 2d\tan\left(\frac{A_{VS}}{2}\right)$$

$$\left(\frac{V}{\sqrt{N}}\right) = \left[\frac{2d\tan\left(\frac{A_{VS}}{2}\right)}{\sqrt{N}}\right] = 2d\tan\left(\frac{A_{VT}}{2}\right)$$

$$\therefore A_{VT} = 2\tan^{-1}\left[\frac{\tan\left(\frac{A_{VS}}{2}\right)}{\sqrt{N}}\right]$$

Similarly, the horizontal target view angle $A_{HT}$ may be calculated according to Equation 2 below.

[Equation 2]

$$\therefore A_{HT} = 2\tan^{-1}\left[\frac{\tan\left(\frac{A_{HS}}{2}\right)}{\sqrt{N}}\right]$$

In addition, combining Equations 1 and 2 yields Equation 3. According to Equation 3, when the view angles of the first and second images 10 and 20 are given, a number N of block divisions can be calculated.

[Equation 3]

$$A_{VT} = 2\tan^{-1}\left[\frac{\tan\left(\frac{A_{VS}}{2}\right)}{\sqrt{N}}\right]$$

$$N \cong \left[\frac{\tan\left(\frac{A_{VS}}{2}\right)}{\tan\left(\frac{A_{VT}}{2}\right)}\right]^2$$

$$\therefore \sqrt{N} \cong \frac{\tan\left(\frac{A_{VS}}{2}\right)}{\tan\left(\frac{A_{VT}}{2}\right)},\ \sqrt{N} \text{ is a positive integer}$$

Additionally, when the view angle of the second image 20 and the number N of blocks are given, the vertical view angle of the first image 10 may be obtained from Equation 4 below. Similarly, the horizontal view angle of the first image 10 may also be calculated.

[Equation 4]

$$A_{VS} = 2\tan^{-1}\left[\sqrt{N}\tan\left(\frac{A_{VT}}{2}\right)\right]$$

Establishing a criterion for the zoom-in ratio may ensure the minimum distance resolution in the target image, i.e., the second image 20. This criterion may indicate the amount of zooming to secure the second image 20. However, since the distance resolution may vary depending on the locus data of the lens mounted on the imaging device 107, the criterion may be based on the distance resolution rather than simply the zoom ratio. A distance resolution Dr is defined as the difference in object distance Δd relative to the difference in focus position ΔF between two points. Therefore, the distance resolution Dr may be calculated according to Equation 5 below. The minimum value of this distance resolution, referred to as the minimum distance resolution, may be empirically obtained through tests in various real-world cases.

[Equation 5]

$$D_r = 100 \times \frac{\Delta d}{\Delta F}$$

For example, in some embodiments of the present disclosure, when the surveillance area using a certain imaging device 107 is at a distance of about 3 to 5 meters, and the minimum distance resolution is 1.5, the minimum zoom ratio of the imaging device 107 can be derived from the locus data. If the zoom ratio is 12×, and the zoom ratio of the first image 10 is 2×, the zoom-in ratio for obtaining the second image 20 can be calculated as 6(=12/2). Even when using an imaging device other than the imaging device 107, the same standard of minimum distance resolution may apply, but the zoom ratio may differ. This is because the locus data may vary between the imaging device 107 and other imaging devices. Therefore, the criterion for determining the lower limit of the number N of block divisions may be based on the minimum distance resolution rather than the zoom ratio.

In addition to distance resolution, the focus depth according to the zoom ratio may also be considered. As mentioned previously, the distance resolution Dr at a zoom ratio of 12× for a distance of 3 to 5 meters may be 1.5. At this time, if a focus depth Fd at a zoom ratio of 12×, according to the locus data, is 3.85, the zoom ratio of the second image 20 may be determined based on a reference value Rv calculated according to Equation 6 below, where both distance resolution and focus depth are considered.

[Equation 6]

$$R_v = 2 \times D_r \times F_d$$

For example, if the reference value Rv at a zoom ratio of 12× for a distance of 3 to 5 meters using the imaging device 107 is 11.55, the zoom ratio may be determined in another imaging device that makes the reference value Rv become 11.55 at the same distance of 3 to 5 meters. Here, the reason for multiplying the distance resolution Dr by 2 is that there are both far and near sides in the focus distance. Ultimately, the zoom-in ratio of the second image 20 may be determined by dividing the determined zoom ratio by the zoom ratio of the first image 10.

Equations 7 through 9 below illustrate a calculation process according to some embodiments of the present disclosure.

(1) When the zoom ratio of the first image 10 is 1×, the zoom ratio of the second image 20, which can cover 25 blocks, may be determined according to the following Equation 7. Here, the vertical view angle of the imaging device 107 at 1× zoom is 16.7657.

[1]

[Equation 7]

$$\sqrt{N} = 5,\ A_{VS} = 16.7657$$

$$A_{VT} = 2\tan^{-1}\left[\frac{\tan\left(\frac{A_{VS}}{2}\right)}{\sqrt{N}}\right]$$

$$\therefore A_{VT} = 3.376°$$

Based on the locus data, the zoom ratio of the imaging device 107 corresponding to a vertical view angle of 3.376 may be 5.34×. Therefore, since this may be smaller than the 12× zoom ratio that provides the minimum distance resolution for the imaging device 107, the number N of block divisions may be increased. This indicates that if the number N of divisions is fixed at 25, the zoom ratio of the first image 10 may need to be greater than 1×.

(2) The number of blocks required to cover a target zoom ratio of 12× from a starting zoom ratio of 1× may be calculated according to the following Equation 8. Here, the vertical view angle of the imaging device 107 at 1× zoom is 16.7657, and the vertical view angle at 12× zoom is 1.5405.

$$\sqrt{N} \cong \frac{\tan\left(\frac{A_{VS}}{2}\right)}{\tan\left(\frac{A_{VT}}{2}\right)},\ \sqrt{N}\ \text{is a positive integer} \qquad \text{[Equation 8]}$$

$$\sqrt{N} = 10.9609 \cong 11$$

Thus, at least 121 divisions are required to secure the minimum distance resolution.

(3) The starting zoom ratio for covering a target zoom ratio of 12× using 25 blocks may be calculated according to the following Equation 9.

$$A_{VS} = 2\tan^{-1}\left[\sqrt{N}\tan\left(\frac{A_{VT}}{2}\right)\right] \qquad \text{[Equation 9]}$$

$$\therefore A_{VS} = 7.691°$$

Based on the locus data, the zoom ratio of the imaging device 107 corresponding to a vertical view angle of 7.691 is 2.26×. Therefore, if the first image 10 captured at a zoom ratio of 2.26× is divided into 25 blocks, the minimum distance resolution can be secured in the second image 20.

The user interface 160 may receive a trigger command inputted from the user to divide the image into a plurality of blocks. Through this, the user may store spatial information for the entire area (all blocks) with a simple operation such as clicking a button at the desired view angle. However, the lower and upper limits of the range of the number N of divisions may both need to be set. The upper limit of the range of the number N of divisions may be set to ensure that the processing time required for the distance sensor 150 to acquire the distance information for each block remains below a threshold value. According to some examples, a reason for setting the upper limit of the range of the number N of divisions is that although a sufficient number of divisions may ensure the minimum distance resolution, increasing the number of divisions may proportionally increase the processing time, including the computational time and PTZ control time. Even if the most accurate results can be obtained, excessive processing time may increase the load on the distance information generation apparatus 100 and decrease the efficiency of the operation of the imaging device.

However, since this upper limit depends on hardware specifications such as the CPU, it may be determined by considering the computation time of the distance sensor 150 and the controller 101. For example, according to Equation 8, when the current zoom ratio of the first image 10 is 1×, the number N of block divisions required to cover a 12× zoom ratio in the second image 20 to secure the minimum distance resolution is 121. Therefore, if the user inputs a trigger command for the first image 10, the first image 10 may be divided into 121 blocks, but this number may exceed the computation time threshold. Conversely, if the first image 10 is divided into 25 blocks based on the computation time threshold, the zoom ratio of the second image 20 may become lower than 12×, which may not secure the minimum distance resolution. Therefore, both the lower and upper limits of the number of block divisions may be used to secure the minimum distance resolution and keep the computation time (or processing time) below the threshold.

However, in some situations, it may not be practical to meet both the lower and upper limits of the number of block divisions. For example, if the number of block divisions needs to be greater than N from the perspective of the minimum distance resolution, but from the perspective of computation time, the number of block divisions must be less than N. Among some examples, this problem may be solved by using a zoomed-in image as the starting image instead of the original zoom ratio when the trigger command is input, and dividing the zoomed-in starting image.

According to Equation 9, if the imaging device 107 captures an image at a zoom ratio of 2.26×, and that image is divided into 25 blocks, the target image 20 may have a zoom ratio of 12×, ensuring that the minimum distance resolution is satisfied.

Figure 8:
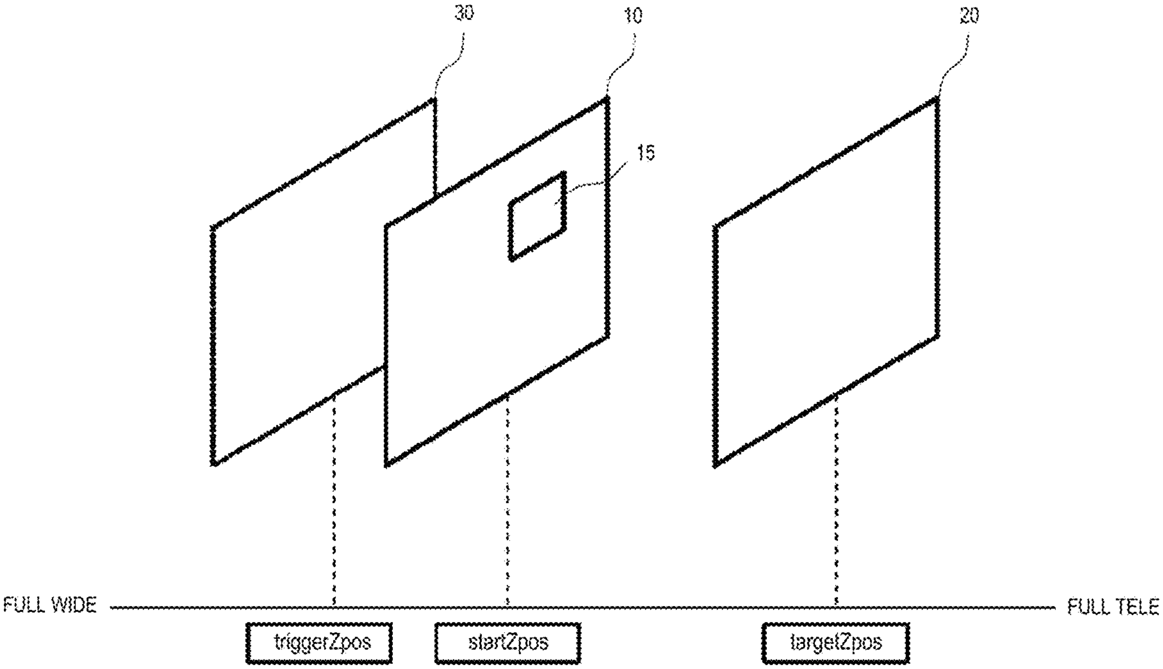
FIG. 8 is a diagram illustrating the relationship between a trigger image, a start image, and a target image according to an embodiment of the present disclosure.

Referring to FIG. 8, all images may exist between the minimum zoom ratio (full wide) and the maximum zoom ratio (full tele). Here, the zoom ratio of a trigger image 30, when the user inputs a trigger command, is referred to as triggerZpos, the zoom ratio of the starting image, i.e., the first image 10, zoomed in from the trigger image 30 is referred to as startZpos, and the zoom ratio of the target image, i.e., the second image 20, may be referred to as targetZpos.

When the number of divisions of the trigger image 30 is calculated based on the condition that targetZpos satisfies the minimum distance resolution, it may exceed the threshold of processing time. In this case, the first image 10, derived from the trigger image 30, may be obtained. Here, the degree of zoom-in (startZpos/triggerZpos) may be determined based on the condition that the first image 10, when divided into the number N of divisions that does not exceed the threshold of processing time, satisfies the minimum distance resolution for the second image 20.

By using the zoomed-in first image 10 as the starting image and dividing it into N blocks, blocks 15 may be obtained, and by zooming in each block 15 to become the size of the first image 10, the second image 20 may be obtained.

In some examples, as described above, the distance sensor 150 may estimate the focus position for the second image 20 corresponding to each block 15 and convert the estimated focus position into distance information using locus data.

However, in addition to this method, in which the distance sensor 150 acquires distance information for each divided block 15 using image processing, it may also be possible to measure absolute distance using a distance meter. For example, by attaching a distance meter in parallel with the imaging direction of the imaging device 107 and performing only pan/tilt control to direct the imaging device 107 toward each divided block 15, the absolute distance may be directly measured by the distance meter without the need for zooming in or focus estimation. The distance meter may use methods such as Lidar or laser to measure the time of flight (TOF) of reflected light.

Figure 9:
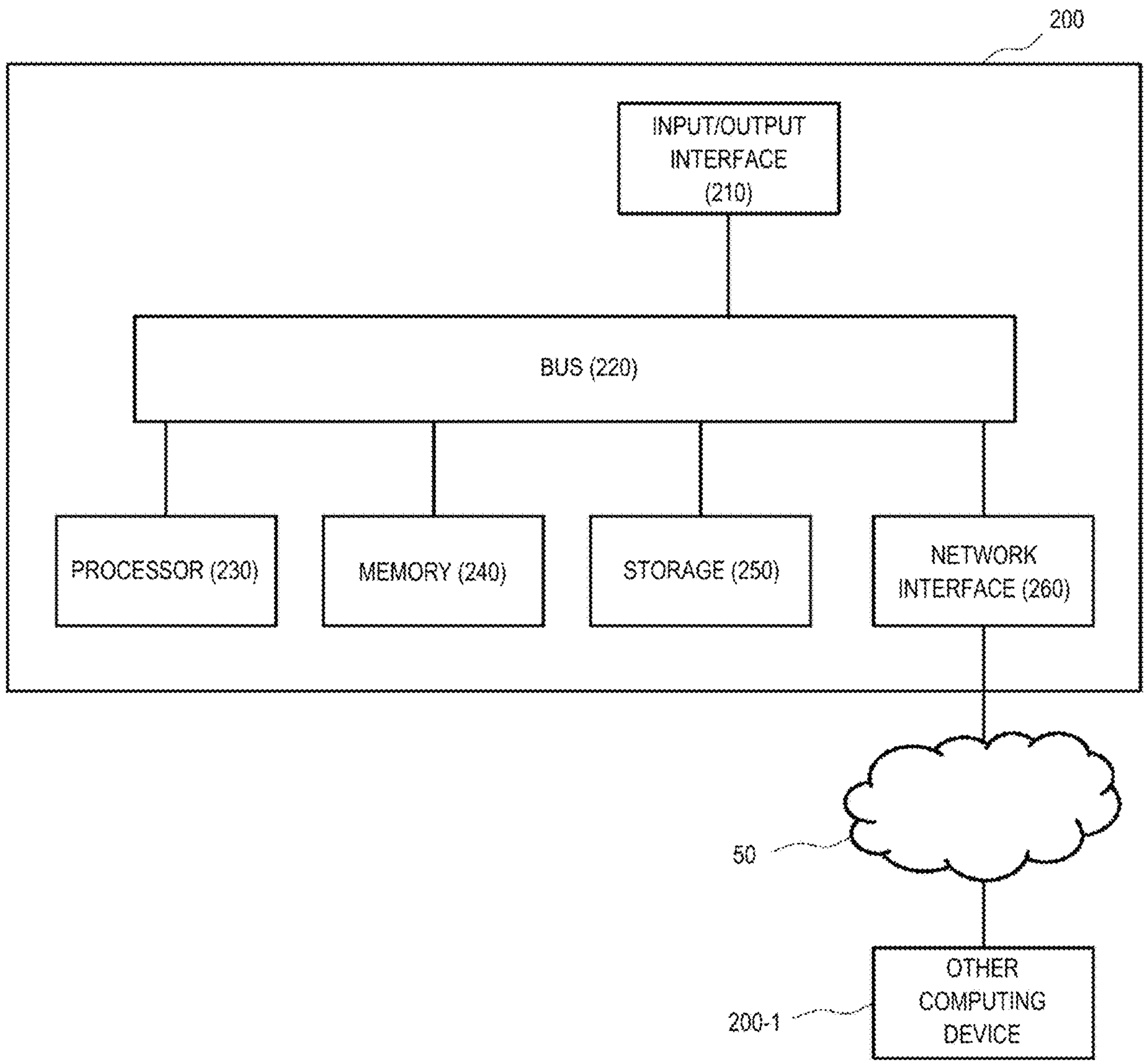
FIG. 9 is a diagram illustrating the hardware configuration of a computing device that implements the distance information generation apparatus of FIG. 1 according to an embodiment of the present disclosure.

FIG. 9 is a diagram illustrating the hardware configuration of a computing device 200 that implements the distance information generation apparatus 100 of FIG. 1.

The computing device 200 may include a bus 220, at least one processor 230, at least one memory 240, a storage 250, an input/output interface 210, and a network interface 260. The bus 220 is a data transmission path that may enable the processor 230, memory 240, storage 250, input/output interface 210, and network interface 260 to transmit and receive data. However, the method of connecting the processor 230 and other components is not limited to bus connections.

The processor 230 may include at least one processor such as a central processing unit (CPU), a graphics processing unit (GPU), an accelerated processing unit (APU), a many integrated core (MIC), a field-programmable gate array (FPGA), a digital signal processor (DSP), a neural processing unit (NPU), a hardware accelerator, a machine learning accelerator, or the like. The memory 240 is a memory such as a random-access memory (RAM) or read-only memory (ROM). The storage 250 is a storage device such as a hard disk, solid state drive (SSD), or memory card. The storage 250 may also be a memory such as a RAM or ROM.

The input/output interface 210 may include an interface for connecting the computing device 200 to an input/output device. For example, a keyboard or mouse may be connected to the input/output interface 210.

The network interface 260 may be an interface that enables the computing device 200 to communicate with external devices and transmit and receive packets. The network interface 260 may be either a wired or wireless network interface. For example, the computing device 200 may be connected to another computing device 200-1 through a network 50. The network 50 may include a wired network such as local area networks (LANs), wide area networks (WANs), metropolitan area networks (MANs), and integrated service digital networks (ISDNs), etc., a wireless network including wireless Internet such as 3G, 4G (LTE), 5G, Wi-Fi, Wireless Internet such as Wibro, Wimax, etc. a wireless network including short-distance communication and short distance networks, such as Bluetooth, radio frequency identification (RFID), Infrared Data Association (IrDA), Ultra Wideband (UWB), ZigBee, Near field communication (NFC), etc. In wireless mobile communication, a communication network may further include a component such as a base transceiver station (BTS), a mobile switching center (MSC), a home location register (HLR), an access gateway that enables transmission and reception of wireless packet data, and a packet data serving node (PDSN).

The storage 250 may store program modules that implement the respective functions of the computing device 200. The processor 230 may implement each function by executing the respective program module. The processor 230 may read these program modules from the storage 250 into the memory 240 and then execute them.

Figure 10:
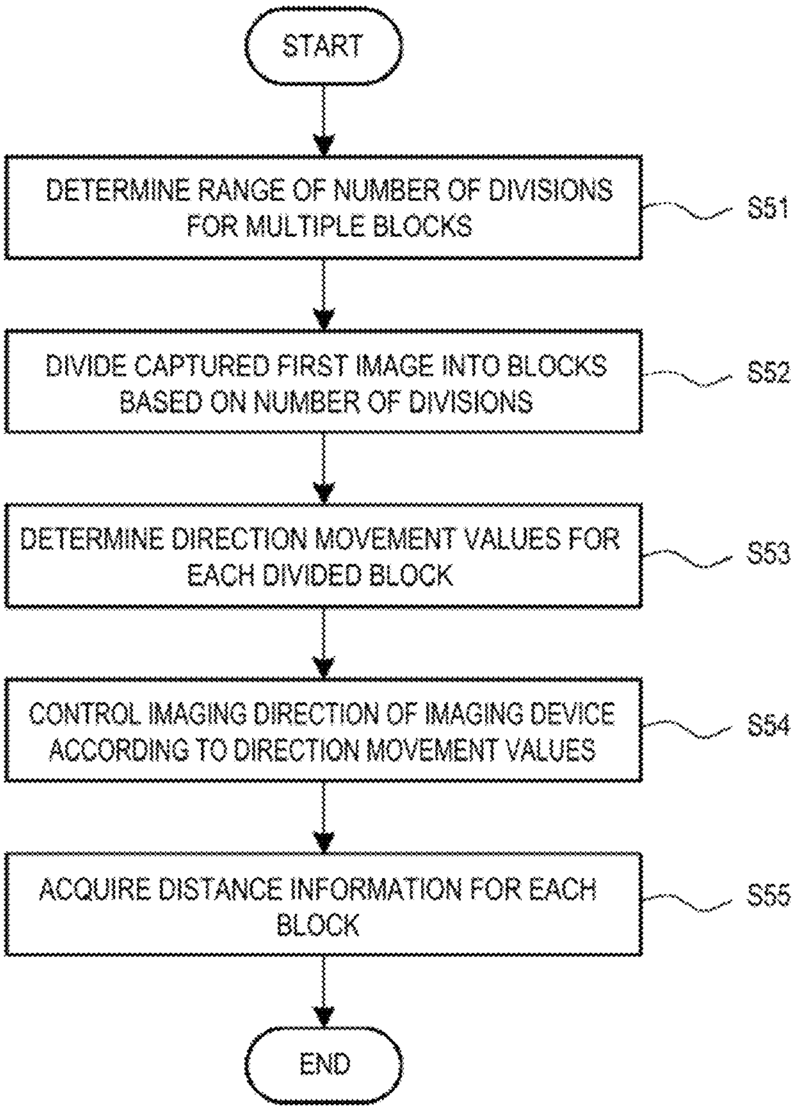
FIG. 10 is a flowchart schematically illustrating a distance information generation method according to an embodiment of the present disclosure.

FIG. 10 is a flowchart illustrating a distance information generation method performed by the distance information generation apparatus 100, which includes at least one processor and at least one memory that stores program instructions executed by the at least one processor, according to an embodiment of the present disclosure.

First, the range calculator 110 may determine the range of the number of divisions for dividing the first image 10 captured by the imaging device 107 into a plurality of blocks (S51). The plurality of blocks are M×M blocks obtained by dividing the first image 10 in both the horizontal and vertical directions, where M is a natural number.

The block divider 120 may divide the first image 10 into blocks according to the number of divisions (S52). The lower limit of the range of the number of divisions may be a value that enables the imaging device 107 to secure the minimum distance resolution, and the upper limit of the range of the number of divisions is a value that ensures the processing time required for the distance sensor 150 to acquire the distance information for each block is below the threshold.

The movement value calculator 140 may determine the direction movement values for targeting each block among the divided blocks (S53). The direction movement values may include PTZ values for each block.

The imaging device 107 may control the imaging direction according to the determined direction movement values and capture a second image 20 (S54).

The distance sensor 150 may analyze the captured second image 20 to acquire the distance information for each block (S55). The distance information may be obtained by estimating the focus position for each block 15 and converting the estimated focus position into distance information using locus data.

According to some examples of the present disclosure, after generating distance information for each divided block within an image being captured by a video surveillance system, the generated distance information can be provided to the user when the corresponding block becomes a point of interest, or rapid auto-focusing or event detection can be performed using the generated distance information.

According to an embodiment, the of process may be continuously performed in intervals so as to repeatedly update the distance information of the plurality of blocks. In some examples, because the distance information is repeatedly generated for each of the divided blocks, the accuracy of the focus of the plurality of blocks may be improved. Additionally, in some examples, because the distance information is predetermined for each of the plurality of blocks is pre-determined, the auto-focusing operation for an arbitrary region determined by a user may be performed at a faster rate.

According to an embodiment, the methods according to the various embodiments disclosed in the present document may be included and provided in a computer program product. The computer program product may be traded as a product between a seller and a purchaser. The computer program product may be distributed in a form of the machine-readable storage medium (for example, a compact disc read only memory (CD-ROM)), or may be distributed online through an application store (e.g., PlayStore™). In case of the online distribution, at least a part of the computer program product may be at least temporarily stored or temporarily provided in the storage medium such as a server memory of a manufacturer, a server memory of an application store, or a relay server memory.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

What is claimed is:

1. A distance information generation apparatus comprising:

at least one processor; and at least one memory storing program instructions, wherein, by executing the program instructions, the at least one processor is configured to:

divide a first image captured by an imaging device into a plurality of blocks;

determine direction movement values for at least one target block among the plurality of divided blocks;

control an imaging direction of the imaging device based on the direction movement values of the at least one target block; and acquire distance information for the at least one target block based on a second image captured by the imaging device, wherein the direction movement values include pan and tilt values calculated based on positional offsets between a center of the first image and a center of the at least one target block, and wherein the at least one processor is further configured to:

change an imaging direction based on the pan and tilt values, zoom-in the target block so that the target block occupies an entirety of the second image, and determine a focus position corresponding to the second image and convert the focus position into distance information.

2. The distance information generation apparatus of claim 1, wherein the distance information for the at least one target block is a representative distance value for the at least one target block based on the direction movement values of the at least one target block among the plurality of divided blocks.

3. The distance information generation apparatus of claim 1, wherein the first image is divided into M blocks in a horizontal direction and a vertical direction, in which M is a natural number.

4. The distance information generation apparatus of claim 1, wherein the at least one processor is further configured to:

provide, through a user interface, distance information for one or more blocks corresponding to a region of interest based on a specific position in the first image being set as the region of interest.

5. The distance information generation apparatus of claim 1, wherein the at least one processor is further configured to:

obtain, through a user interface, a specific position in the first image as a region of interest, acquire distance information for the region of interest based on distance information for one or more blocks corresponding to the region of interest, and control the imaging device to capture an image based on a focus distance according to the acquired distance information.

6. The distance information generation apparatus of claim 5, wherein the at least one processor is further configured to:

based on the region of interest spanning two or more blocks, obtain the distance information for the region of interest based on distance information of each of the two or more blocks and an area ratio of an overlapping portion between the region of interest and each of the two or more blocks.

7. The distance information generation apparatus of claim 5, wherein the at least one processor is further configured to:

based on a continuous automatic focusing operation (auto-focusing) for the region of interest, obtain the distance information for the region of interest at a first time based on the distance information for each of two or more blocks, and an area ratio of an overlapping portion between the region of interest and each of the two or more blocks based on the region of interest moving to span the two or more blocks at the first time.

8. The distance information generation apparatus of claim 1, wherein the at least one processor is further configured to:

determine a scan order of the plurality of divided blocks.

9. The distance information generation apparatus of claim 1, wherein the at least one processor is further configured to determine a range of a number of divisions for the plurality of blocks.

10. The distance information generation apparatus of claim 9, wherein a lower limit of the range of the number of divisions is based on a value that enables the imaging device to obtain a minimum distance resolution.

11. The distance information generation apparatus of claim 10, wherein an upper limit of the range of the number of divisions is based on a value that enables a processing time to acquire the distance information for the at least one target block to be below a threshold.

12. The distance information generation apparatus of claim 11, wherein the at least one processor is further configured to:

receive, through a user interface, a trigger command from a user to divide the first image into the plurality of blocks.

13. The distance information generation apparatus of claim 12, wherein the at least one processor is further configured to:

based on the lower limit of the range being determined to be greater than or equal to the upper limit, control the imaging device to capture a zoomed-in image from the first image, and divide the captured zoomed-in image into the plurality of blocks.

14. A distance information generation method performed by an apparatus having at least one processor and at least one memory that stores program instructions executed by the at least one processor, the distance information generation method comprising:

dividing a first image captured by an imaging device into a plurality of blocks;

determining direction movement values for capturing at least one target block among the plurality of divided blocks as targets;

controlling an imaging direction of the imaging device based on the direction movement values of the at least one target block; and acquiring distance information for the at least one target block based on a second image captured by the imaging device, wherein the direction movement values include pan and tilt values calculated based on positional offsets between a center of the first image and a center of the at least one target block, wherein the controlling the imaging direction of the imaging device includes changing an imaging direction based on the pan and tilt values, and zooming-in the target block so that the target block occupies an entirety of the second image, and wherein the acquiring distance information includes determining a focus position corresponding to the second image and converts the focus position into distance information.

15. The distance information generation method of claim 14, wherein dividing the first image comprises:

dividing the first image into M blocks in a horizontal direction and a vertical direction, in which M is a natural number.

16. The distance information generation method of claim 15, wherein the direction movement values include pan, tilt, and zoom (PTZ) values for the at least one target block, and wherein the second image is a zoomed-in image having a same size as the first image.

17. The distance information generation method of claim 14, further comprising:

determining a range of a number of divisions for the plurality of blocks, wherein a lower limit of the range of the number of divisions is based on a value that enables the imaging device to secure a minimum distance resolution, and wherein an upper limit of the range of the number of divisions is based on a value that enables a processing time to acquire the distance information for the at least one target block to be below a threshold.

* * * * *